United States Patent
Gerber et al.

(10) Patent No.: US 9,816,884 B2
(45) Date of Patent: Nov. 14, 2017

(54) FORCE MEASURING SYSTEM WITH DUAL SENSOR

(71) Applicant: tecsis GmbH, Offenbach (DE)

(72) Inventors: Alexander Gerber, Mainaschaff (DE); Daniel Niedballa, Langen (DE); Oliver Jost, Langen (DE)

(73) Assignee: tecsis GmbH, Offenbach (DE)

( * ) Notice: Subject to any disclaimer, the term of this patent is extended or adjusted under 35 U.S.C. 154(b) by 0 days.

(21) Appl. No.: 15/089,003

(22) Filed: Apr. 1, 2016

(65) Prior Publication Data
US 2016/0305834 A1 Oct. 20, 2016

(30) Foreign Application Priority Data
Apr. 17, 2015 (DE) .................. 10 2015 004 937

(51) Int. Cl.
| | | |
|---|---|---|
| *G01N 3/00* | (2006.01) | |
| *G01L 5/00* | (2006.01) | |
| *G01L 1/22* | (2006.01) | |

(52) U.S. Cl.
CPC .......... *G01L 5/0061* (2013.01); *G01L 1/2206* (2013.01); *G01L 1/2268* (2013.01); *G01L 5/0004* (2013.01)

(58) Field of Classification Search
CPC ... G01L 5/0061; G01L 1/2206; G01L 1/2268; G01L 5/0004
USPC .......................................................... 73/796
See application file for complete search history.

(56) References Cited

U.S. PATENT DOCUMENTS

| | | | | | |
|---|---|---|---|---|---|
| 4,375,243 | A | * | 3/1983 | Doll ....................... | G01G 3/142 177/164 |
| 4,632,198 | A | * | 12/1986 | Uchimura ............ | G01G 3/1412 177/211 |
| 6,502,860 | B1 | * | 1/2003 | Siegfried ................ | B60R 22/18 280/801.1 |
| 2007/0034023 | A1 | * | 2/2007 | Browning ................. | G01L 1/14 73/862.638 |
| 2007/0056380 | A1 | * | 3/2007 | Chan .................. | G01R 31/2648 73/775 |
| 2010/0286304 | A1 | * | 11/2010 | Lesser ........................ | C08J 3/24 522/188 |
| 2011/0112537 | A1 | * | 5/2011 | Bernstein ........... | A61B 17/8869 606/74 |

FOREIGN PATENT DOCUMENTS

DE                243 985 A1     3/1987

* cited by examiner

*Primary Examiner* — Max Noori
(74) *Attorney, Agent, or Firm* — Muncy, Geissler, Olds & Lowe, P.C.

(57) ABSTRACT

For measuring tensile and/or compressive loads force measuring systems are provided for measuring a tensile and/or compressive load of a structure have a first force measuring sensor assigned to the structure, and a second force measuring sensor assigned to the structure. To provide a force measuring system that enables high measuring accuracy, the first and the second force measuring sensor differ in such a way, that the first force measuring sensor is designed to measure a nominal load range, and the second force measuring sensor is designed to measure a sub-range of the nominal load range.

11 Claims, 6 Drawing Sheets

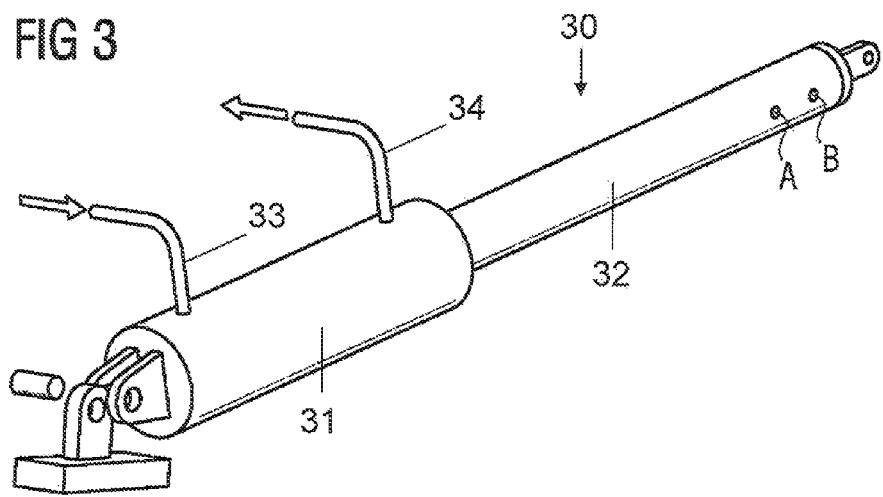
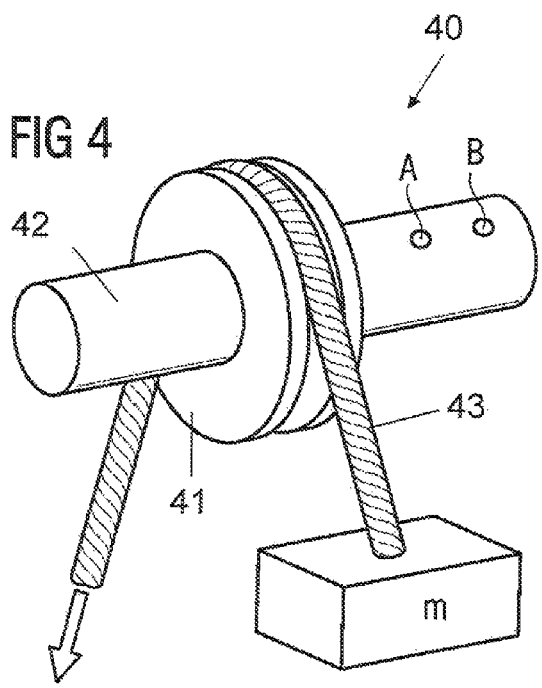
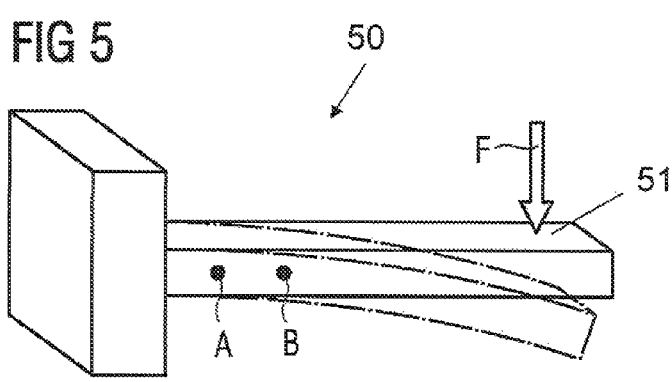

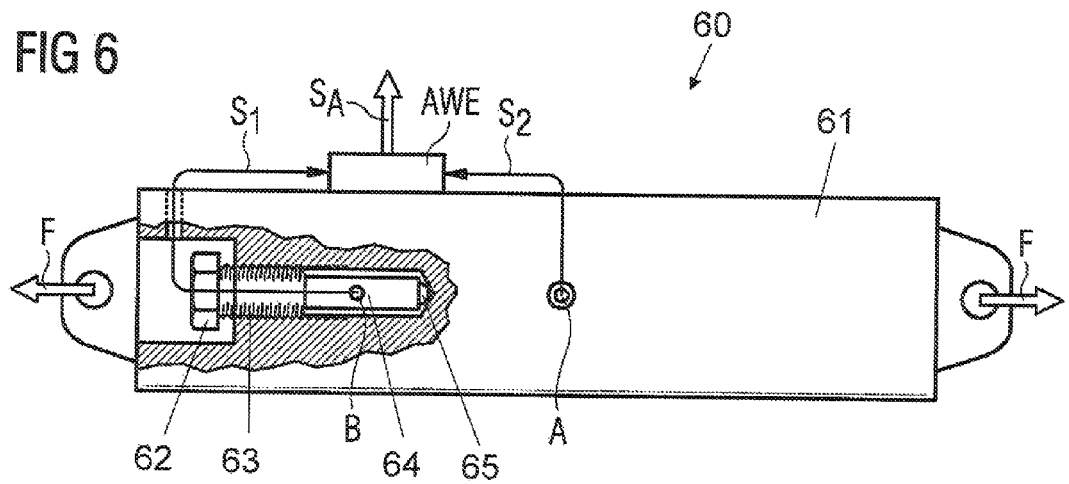
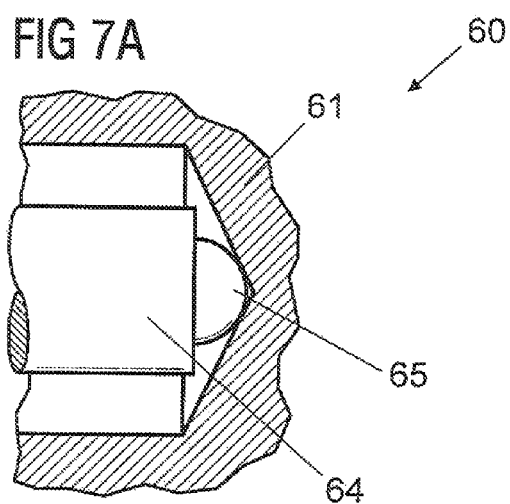
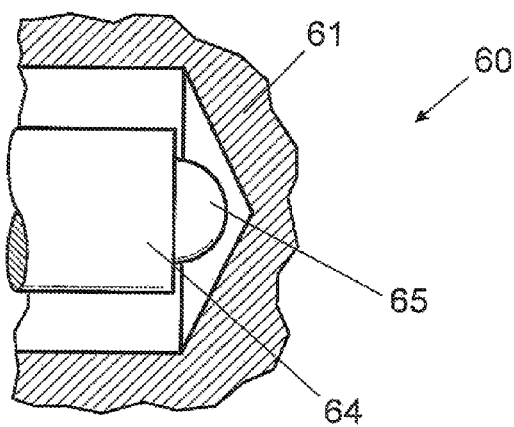

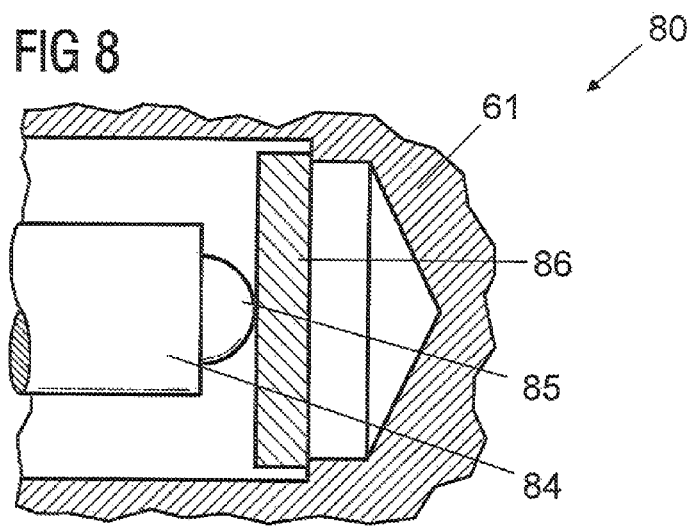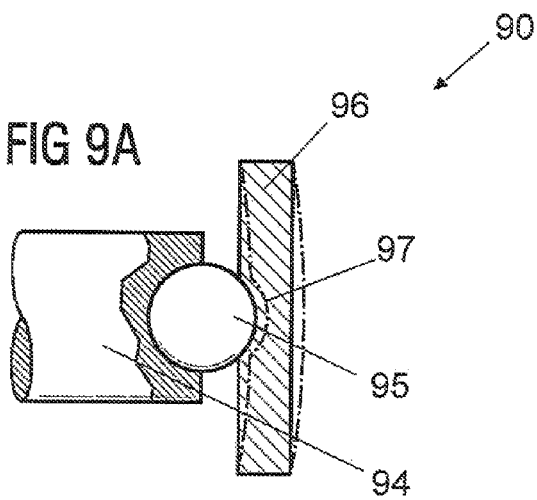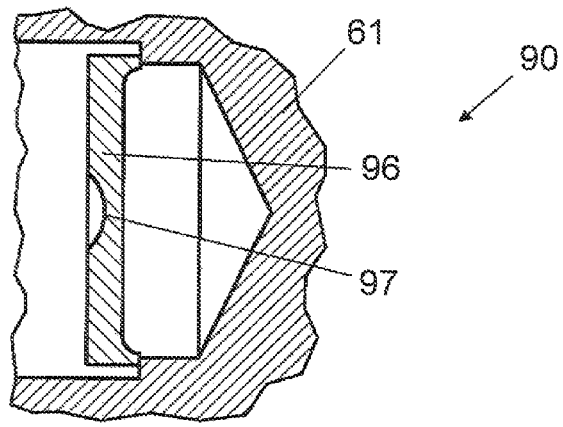

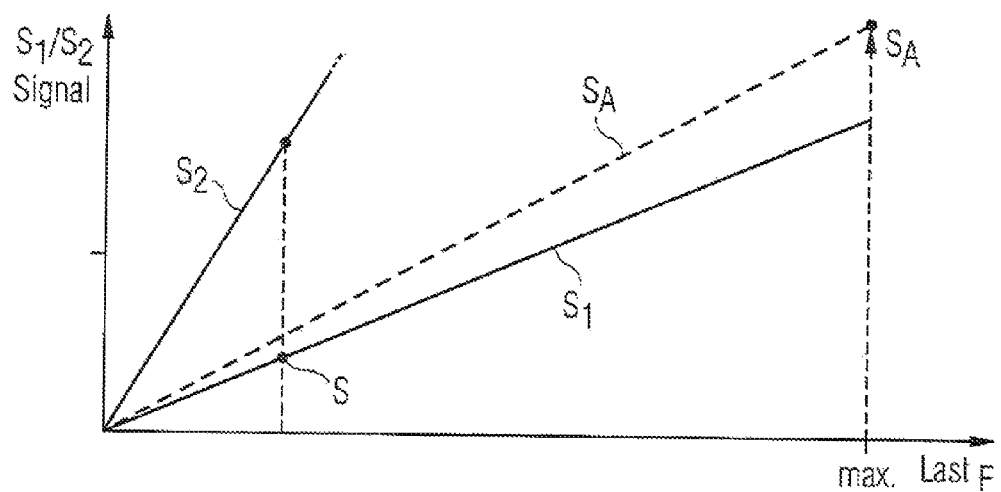

FORCE MEASURING SYSTEM WITH DUAL SENSOR

This nonprovisional application claims priority under 35 U.S.C. §119(a) to German Patent Application No. 10 2015 004 937.2, which was filed in Germany on Apr. 17, 2015, and which is herein incorporated by reference.

BACKGROUND OF THE INVENTION

Field of the Invention

The invention relates to a force measuring system for measuring a tensile and/or compressive load applied to a structure, in which the structure is assigned a first force measuring sensor and a second force measuring sensor. The present invention also relates to a method for measuring a tensile and/or compressive load of a structure via the force measuring system, that can include the steps of: measuring of a force applied to the structure by a tensile and/or compressive load using the first force measuring sensor while receiving a first measuring signal; measuring of a force using a second force measuring sensor while receiving a second measuring signal; and evaluation of the first and the second measuring signal Description of the Background Art A structure, which can also be referred to as a "measurement structure," can be used for example as a separate measuring element in load-stressed equipment and machinery or as a component of such equipment and machinery, such as, for example, a crane. Conventional measurement structures are bending beams, axles, bolts, measuring tabs, hooks, carriers, support struts or hydraulic cylinders. These can be subject to a very high mechanical stress, for example tensile, compressive, bending, shear or torsional stress.

For measuring and evaluating a mechanical stress of components it is known to use a force measuring system having one or more force measuring sensors which capture the forces occurring on the measurement structure. Force measurement can be based on various measuring principles, for example, be measured by virtue of force measurement or strain measurement. The force measuring sensor delivers an electrical measurement signal which is evaluated to determine the current force and the tensile and/or compressive load.

The strength of the measurement signal depends on the force measuring sensor used. Its measuring range is designed for a maximum of the expected stress and is also called a "nominal load range".

In order to obtain a more reliable measurement signal it is known to provide a force measuring system having multiple force measuring sensors. Such a force measuring system is described in DD 243 985 B5, from which a force measuring sensor is also known. It has multiple force sensors in the form of strain gauges, which are disposed relative to the measurement structure in such a way, that a measurement signal is obtained which is optimized in respect of the signal strength.

If forces are to be measured over a large measurement range, the known force measuring sensors display a certain measuring inaccuracy since the measuring accuracy of a sensor does not only depend on its design, but also on the size of its nominal measuring range. In principle, due to the resolution of all force measurement configurations and load cells, it is metrologically given that the measuring accuracy in each lower load measuring range is lower than in the upper load measuring range.

SUMMARY OF THE INVENTION

It is therefore an object of the invention to provide a force measuring system for measuring a tensile and/or compressive load of a structure that enables force measurement over a wide measurement range, while still providing high measurement accuracy. In addition, the force measuring system should be simple and inexpensive to manufacture.

Furthermore, the invention addresses the object of providing a method for measuring a tensile and/or compressive load of a structure that allows for reliable measurement as well as high measurement accuracy.

In an exemplary embodiment, a force measuring system, can provide that the first and second force measuring sensor differ from one another to the effect that the first force measuring sensor can be designed to measure a first sub-range of a nominal measuring range of the tensile and/or compressive load, and that the second force measuring sensor can be designed to measure a second sub-range of this nominal measuring range.

The two ranges can overlap, and in a lower resolution range, the second sensor delivers measured values of a higher quality than the first sensor.

To this end, in the inventive force measuring system, two or more different force measuring sensors are assigned to the structure. These can be designed to measure the same force occurring in the measurement range. However, they differentiate in regards to their measuring range or their structural design or their nominal load type.

In respect of the measuring range, the sensors have a different measuring sensitivity: each structural design has a different construction, for example, conventional strain sensors with a film carrier, strain sensors produced by means of thin film technology or steel sensors with a sputtered strain sensor. Regarding the stress, the difference may be that the one sensor is expanded and the other is compressed, or that one is loaded and the other is unloaded. The first force measuring sensor and the at least one further, second force measuring sensor may each also be composed as a sensor unit of structurally identical sensors, which differ at least in sensitivity.

In an embodiment, an object of the invention is solved in that the force measuring system is equipped with two sensors, and wherein the first and the second force measuring sensor differ in that the first force measuring sensor is designed to measure the nominal load range of the tensile and/or compressive load, and that the second force measuring sensor is designed to measure only a sub-range of the nominal load range.

To ensure that the force measuring system is able to measure any kind of stress expected in the measurement range of the structure, an exemplary embodiment of the force measuring sensor, namely the first force measuring sensor, is designed such that it covers the overall nominal load range of the tensile and/or compressive load. By contrast, at least a second force measuring sensor is designed such that only a sub-range of the overall nominal load range is measured. The sensor system thus displays a certain redundancy in this measuring range, which for purposes of clarification is also referred to below as "privileged sub-range". In return, the measuring accuracy in the respective sub-range is higher. Accordingly, for measuring the force in the privileged sub-range. The second force measuring sensor can have an improved measuring sensitivity, a more advantageous arrangement and/or a more sensitive load type for the occurring force than the first force measuring sensor. This way, particularly high demands on the measuring accuracy in this sub-range can be fulfilled. This type of equipping with the inventive force measuring system having two complementary and partially redundant force measuring sensors is also referred to below as a "dual sensor system".

The force measuring system can have an evaluation unit which evaluates the measurement signal supplied by the force measuring sensor. Generally, the redundant information about the stress in the privileged sub-range can be used as desired for evaluation purposes. It is preferred that exclusively stresses that are located within the privileged sub-range and to which measurement signals with sufficient signal strength are supplied from the second force measuring sensor be used for evaluation, or that they are weighted higher during evaluation than the measurement signals of the first force measuring sensor.

The privileged sub-range measured with a higher measuring sensitivity is, for example, adapted to the size and type of the stress, which is particularly critical for operation, or in which the first force measuring sensor provides only inadequate measuring accuracy for proper evaluation.

These circumstances are often given at the edges of the nominal load range. For this reason, an exemplary embodiment of the force measuring system provides that the nominal load range is delimited by a minimum value and a maximum value of the tensile and/or compressive load, and that the sub-range expands between the minimum value and an intermediate value, or between an intermediate value and the maximum value.

The measuring range of the second force measuring sensor can hereby be located at the upper or the lower end of the load spectrum of the nominal load range.

Alternatively, a structure may be possible in which in certain load ranges, in each case only one sensor is evaluated, and wherein in an overlapping range, the evaluation electronics allow for switching to the other sensor.

In some operations, however, the demands on the measuring accuracy at the edges of the nominal load range can be adequately fulfilled by the first force measuring sensor, whereas increased demands on the measuring accuracy exist in a central section of the load spectrum. In this regard it has been proven to be advantageous if the nominal load range expands between a minimum value and a maximum value of the tensile and/or compressive load, and if the sub-range expands between a lower intermediate value which is larger than the minimum value, and an upper intermediate value which is smaller than the maximum value.

In this embodiment, the privileged sub-range of the second force measuring sensor covers a central section of the overall nominal load range without its limit values.

The narrower the privileged sub-range is in comparison to the overall nominal load range, the smaller the amount of redundant information, but also the more accurate. To this end, it has proven worthwhile if the sub-range covers a maximum of 70%, preferably a maximum of 50% and particularly preferably a maximum of 30% of the nominal load range.

As previously explained, the privileged sub-range is situated at the edges or in the center of the nominal load range. A size of less than 5% of the nominal load range is generally not very informative.

It has been proven advantageous if the first and the second force measuring sensor are designed such that upon application of force on the structure, one of the force measuring sensors is compressed and the other force measuring sensor is expanded.

Because the force applied to the measuring structure is measured by means of force measuring sensors that are designed for different load types, i.e. for expansion and compression, additional information in the redundant measuring range is obtained.

If the second force measuring sensor is designed only for a sub-range of the overall load potentially applied to the measurement structure, the problem arises that it may be destroyed by a force exceeding its design. To prevent this, an exemplary embodiment of the inventive force measuring system provides that the second force measuring sensor has a pretensioned measuring element which is unloaded when a force with a direction of force opposing the pretensioning acts on the structure. In this regard, we speak of a "dual sensor system", even if a structurally identical sensor is not dually installed.

Pretensioning and force have opposing directions or directional components. Thus, the force applied to the measuring element decreases the tension, or more accurately the pretensioning, to which the measuring element is exposed. The decrease in tension is proportional to the applied force or depends on it in another known form. The degree of the decrease in tension thus ultimately yields the information of the second force measuring sensor on the load applied to the measuring structure. As soon as the force component directed towards the pretensioning is as high as the pretensioning, the measuring element is preferably completely unloaded. This way, destruction is reliably prevented. However, afterwards, the second force measuring sensor can also not deliver any further information on the force currently applied.

Embodiments in which the first force measuring sensor and/or the second force measuring sensor are a force measuring anchor, a strain micrometer, a strain gauge or a steel sensor with a sputtered strain sensor have proven particularly suitable.

In an exemplary embodiment in respect of reliability and operational safety of the force measuring system, the first force measuring sensor and/or the second force measuring sensor are optionally disposed in a common bore hole of the structure or in a separate hole for each sensor. Alternatively, both sensors can also be attached to the outside of a load measuring element, e.g. in the form of two strain gauges.

By arranging in a bore hole of the structure, deterioration due to attrition and other debris as well as undesirable mechanical and corrosive effects on the force measuring sensor are mostly ruled out. For this reason, it is preferable that the bore hole is sealed.

In this context, it has proven advantageous if a hardened molding is disposed in the bore hole, against which a measuring body of the second force measuring sensor is compressed for purposes of creating pretensioning, wherein the measuring body preferably has a contact portion designed as a spherical calotte which is accommodated in a recess of the hardened molding.

Hardening the surface of the molding prevents plastic deformations which may occur as a result of the pretensioning and which may lead to errors in measurement. Designing the contact portion between the molding and the measuring body in the form of a spherical calotte and its corresponding recess prevents a displacement as a result of the pretensioning.

In this context, it has also proven successful if the hardened molding is designed to be resilient so that the hardened molding does not separate from the molding when exposed to tensile and/or compressive stress.

The force measuring system can comprise an evaluation unit which is designed to evaluate a first measurement signal generated by the first force measuring sensor, and a second measurement signal generated by the second force measuring sensor, wherein an output signal that takes into account the first and the second measurement signal is measured at one outlet of the evaluation unit.

In the simplest case, taking into account the first and second measurement signal in the output signal takes place by evaluating only the second measurement signal, as long as the second force measuring sensor supplies a measurement signal within the privileged sub-range which signal strength is above a predetermined threshold value; and apart from that, by the sole evaluation of the first measurement signal.

Alternatively, or additionally, it has also been proven advantageous if a threshold value can be prescribed to the evaluation unit, and if, dependent upon whether the first measurement signal exceeds said threshold value or not, the first or the second measurement signal forms the output signal.

In terms of the method, the abovementioned problem can be solved according to the invention on the basis of a method for measuring a tensile and/or compressive load of a structure of the abovementioned type in that the first force measuring sensor measures a nominal load range, and that the second force measuring sensor measures a sub-range of the nominal load range.

In the method according to the invention, the same force occurring within the measuring range of the measurement structure is measured by at least two force measuring sensors which differ in regards to their measuring range or structural design or their nominal load type.

The first force measuring sensor thereby measures each load to be expected by the force measuring system; it covers the entire nominal load range of the tensile and/or compressive load. At least one further, the second, force measuring sensor is on the contrary designed such that it measures only a sub-range of the total nominal load range. The second force measuring sensor thus has a better resolution, a more favorable arrangement and/or a more sensitive load type for the force produced to be able to measure the force in the privileged sub-range as well as in the lower region of the total tensile resolution than the first force measuring sensor. By means of this "dual sensor system", particularly high demands on the measuring accuracy in this sub-range of the total load resolution can be fulfilled.

The privileged sub-range measured with a higher measuring sensitivity is, for example, tailored to size and type of the stress that is particularly critical for operation, or in which the first force measuring sensor only provides inadequate measuring accuracy for proper evaluation.

In general, the redundant information on the stress in the privileged sub-range can be utilized to evaluate the stress in the measuring range of the measurement structure. Preferably, the evaluation of the measurement signals supplied by the force measuring sensors occurs in such a way that forces on the measurement structure that are within the privileged sub-range and are supplied by the second force measuring sensor, are evaluated exclusively or weighted higher for evaluation than the measurement signals of the first force measuring sensor, on the condition that the signal strength of the measurement signal is above a predetermined threshold value which may also equal zero.

Further scope of applicability of the present invention will become apparent from the detailed description given hereinafter. However, it should be understood that the detailed description and specific examples, while indicating preferred embodiments of the invention, are given by way of illustration only, since various changes, combinations and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 3 shows a force measuring system on a hydraulic cylinder having a dual sensor system.

FIG. 4 shows a force measuring system having a dual sensor system on an axle.

FIG. 5 shows a force measuring system on a bending beam having a dual sensor system.

FIG. 6 shows a tensile measuring rod having a first sensor A for directly resolving tension, and a second more sensitive sensor B which is pretensioned by threading.

FIG. 7A shows the tip of the threaded sensor portion B as a cutout, contained in the bore hole in a tensile measuring rod from FIG. 6.

FIG. 7B shows the raised tip of the threaded sensor portion B as a cutout, in a tensile measuring rod from FIG. 6 when the sensor is completely unloaded.

FIG. 8 shows the raised tip of the threaded sensor portion B as a cutout, in a tensile measuring rod from FIG. 6, contained in the bore hole via a hardened plate.

FIG. 9A shows the raised tip of the threaded sensor portion B as a cutout, in a tensile measuring rod from FIG. 6, contained in the bore hole via a hardened plate, wherein a sphere is inserted and the plate has a recess for the sphere.

FIG. 9B shows the plate from 9A, insertable in a tensile measuring rod, wherein the plate is optimized for flexion and support.

FIGS. 10a, 10b and 10c show the signal path of the first and second force measuring sensor, dependent on the force applied to the measuring range.

DETAILED DESCRIPTION

Figure 1:
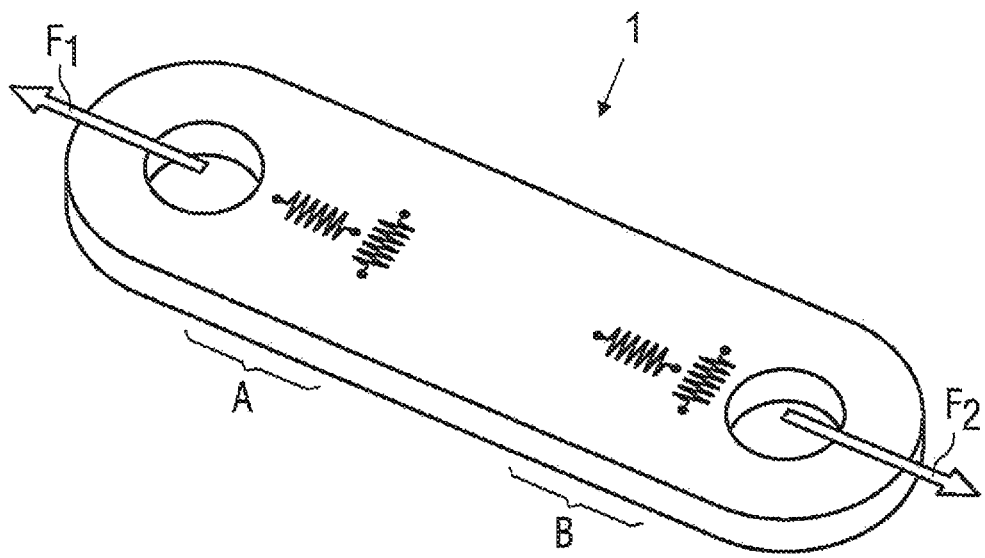
FIG. 1 shows a tensile measuring rod, for example, for cranes having two sensors.

FIG. 1 shows a tensile measuring rod for a crane having the reference numeral 1. The tensile measuring rod 1 is designed such that it can measure applied forces F (F1, F2, for example F1=F2) and can transmit these to an evaluation unit (not shown) of the crane 25.

The tensile measuring rod 1 comprises a force measuring system having a first force measuring sensor A and a second force measuring sensor B. The first force measuring sensor A and the second force measuring sensor B each comprise two perpendicular strain gauges. The strain gauges are foil strain gauges. The first force measuring sensor A is designed to measure a nominal load range of 0 meganewton (MN) up to a maximum nominal load of one hundred meganewton (MN). It is able to measure a range from 0% to 100%, in accordance with the maximum nominal load. The force measuring sensor A has a measuring accuracy of, for example, 0.25% of the end value, in the range from 0% to 110% in accordance with the maximal nominal load range.

The second force measuring sensor B is designed to measure a nominal load range from 0% to 30%, in accordance with the maximum nominal load of force sensor A.

Figure 2:
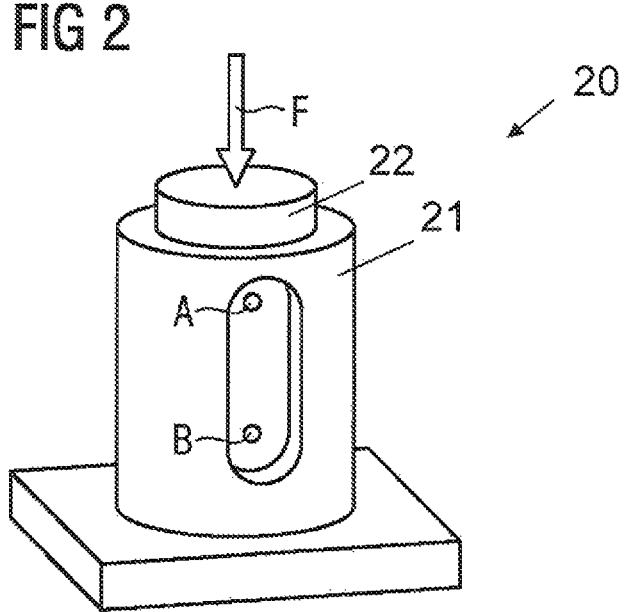
FIG. 2 shows a pressure sensor having a dual sensor system.

FIG. 2 shows a pressure sensor with the reference numeral 20. The pressure sensor 20 has a housing 21 for a cylindrical transducer 22. The transducer 22 comprises two force measuring sensors in the form of steel sensors having a sputtered strain sensor which are denoted by the reference numerals A, B. If a force F is applied on the transducer 22, the transducer 22 is elastically deformed. The deformation of the transducer 22 is converted into electrical measurement signals via the strain sensors which electrical resistance changes with the strain.

The first force measuring sensor A is designed to measure a nominal load range from 0 MN to a maximum nominal load of 100 MN. It can measure a range from 0% to 100%, in accordance with the maximum nominal load. The force measuring sensor A has a measuring accuracy of 0.25% of the end value, in the range from 0% to 110%, in accordance with the maximum of the nominal load range.

The second force measuring sensor B is designed to measure a nominal load range from 0% to typically 30%, in accordance with the maximum nominal load of force sensor A.

The second force measuring sensor has a measuring accuracy of typically 0.1% of the end value.

FIG. 3 shows a hydraulic cylinder 30. The hydraulic cylinder 30 comprises a cylinder body 31 and a piston rod 32. The piston rod 32 is displaceably disposed in the cylinder body 31. The cylinder body 31 is provided with an inlet 33 and an outlet 34 for a fluid. The direction of movement of the piston rod 32 relative to the cylinder body 31 can be adjusted via the feed of a fluid into the cylinder body 31. In addition, the piston rod is provided with two force measuring sensors A, B.

The force measuring sensors have different structures. Force measuring sensor A is a foil strain gauge which is designed to measure a nominal load range from 0-100 MN. Force measuring sensor B is a force measuring anchor which is designed to measure a load range from 0-30%.

FIG. 4 shows an inventive force measuring system 40, for example, for a mobile crane, which is disposed at an axis 42. The axis 42 is provided with a rope pulley 41 over which a rope 43 is routed. A tensile force $F_z$ acts on a weight m over the rope and the rope pulley. The axis 42 is hereby loaded via the rope pulley.

For measuring the loading of axis 42, the axis is assigned a first force measuring sensor A in the form of a strain gauge and a second force measuring sensor B, also in the form of a strain gauge. The force measuring sensor A measures a nominal load range from 0-1 MN. The force measuring sensor B is designed to measure a sub-range from 0-15%. The force measuring sensors are arranged such that during application of force on the axis 42, the force measuring sensor A is expanded and the force measuring sensor B is compressed.

FIG. 5 displays a bending beam as it, for example, can be used in platform weighing. The bending beam which is associated overall with reference numeral 50. The bending beam 50 is provided with an inventive force measuring system comprising two force measuring sensors A and B. Force measuring sensor A is a DMS sensor. Force measuring sensor B is also a DMS sensor or a piezo sensor.

If a force F acts on the bending beam 51 in the range 51, the force measuring sensor A is compressed and the force measuring sensor B is expanded. The force measuring sensor B has a higher measuring sensitivity as compared to force measuring sensor A; it is designed to measure a range from 0 to 10 kN. In this way, a measurement of forces as accurate as possible in this range is guaranteed.

FIG. 6 shows a tensile measuring rod or measuring element which is, for example, used with a crane, or is used as an element for raising containers. The tensile measuring rod is associated overall with the reference numeral 60.

By omitting the two coupling points, in particular a section of a twist lock can be suitable for raising and weighing containers by a rotation locked at the corners.

The tensile measuring rod or the measuring element extends in a longitudinal direction; it comprises a first force measuring sensor A for direct tensile resolution and a second, more sensitive force measuring sensor B.

The first force measuring sensor A is arranged such that when a force F is applied on the tensile measuring rod 60 in the longitudinal direction or the axial direction, the first force measuring sensor A is expanded. The first force measuring sensor is designed to measure a nominal load range which extends from a minimum value of 0 MN to a maximum value of 100 MN.

The second force measuring sensor B is a force measuring anchor which is screwed into a hole of the tensile measuring rod of the measuring element 60. To this end, the hole is provided with an internal thread. The force measuring anchor B has a head section 62 for the engagement of a tool, a threaded portion 63 having an external thread for engagement in the internal thread of the hole, and a sensor portion 64, and a section 65 for contacting the tensile measuring rod and for introducing forces in the sensor portion 64.

The force measuring anchor is screwed into the hole of the tensile measuring rod of the measuring element 60 such that it is compressed and thus pretensioned. That means that the section 65 is in contact with the inner wall of the hole and, when the tensile measuring rod is unloaded, introduces a force proportional to the pretensioning into the sensor portion 64.

If a force is applied in longitudinal direction to the tensile measuring rod of the measuring element 60, the second force measuring sensor B is unloaded so that the tension applied to it is decreased. The reduction of the tension indicates the force applied in the longitudinal direction on the tensile measuring rod.

The pretensioning determines the measuring range of the force measuring anchor. The maximum force that can be measured by such a force measuring anchor corresponds to the pretensioning force of the anchor and the expansion of the tensile measuring rod. A force measuring anchor provided with high pretensioning may thus measure a greater measuring range. Nevertheless, the measuring inaccuracy of the force measuring anchor also increases with the pretensioning. In that respect, optimally adjusted pretensioning is important for an optimal resolution of each sub-range.

If the force applied on the tensile measuring rod of the measuring element in the longitudinal direction compensates the pretensioning force which is applied to the force sensor when the tensile measuring rod is unloaded, the maximum load that the force measuring anchor can measure is reached. According to the invention, the force measuring anchor is designed such that it measures a sub-range of the nominal load range measured by the force measuring sensor A, namely forces in a range from 0-30% of the end value.

The force measuring sensors A, B each generate a sensor signal $S_1$, $S_2$, which is measured as an input signal of an evaluation unit AWE. The evaluation unit AWE takes the sensor signals $S_1$, $S_2$ into account when determining its total output signal $S_A$.

In the simplest case, a threshold value for the sensor signal $S_1$ is provided to the evaluation unit AWE. This threshold value determines up to which sensor signal value the sensor signal $S_1$ provides a higher measuring accuracy than sensor signal $S_2$.

Until the sensor signal $S_1$ reaches the threshold value, the sensor signal $S_1$ provides a higher measuring accuracy than sensor signal $S_2$. The output signal $S_A$ is thus formed solely by or from sensor signal $S_1$.

As soon as sensor signal $S_1$ reaches] this threshold value, the sensor signal $S_2$ forms the output signal $S_A$. In this way, in each case the evaluation unit AWE determines the better value and forms a total output signal $S_A$ therefrom. It is self-evident that as part of the evaluation of 2 different sensor signals, for example, measured voltages with their sensor-specific ranges, a uniform sensor output signal can be converted and emitted in any desired industry format, such as for example HART, Profibus or also as an analog 4-20 mA signal which can be parameterized or configured via a user interface.

It is also possible that the signal is emitted directly via wireless radio.

FIG. 7A displays a section of the tensile measuring rod of the measuring element 60 from FIG. 6. FIG. 7A further shows a cut out of the sensor portion 64 and the contact portion 65 of the force measuring anchor B.

In FIG. 7A, the force measuring anchor B is pretensioned and the tensile measuring rod 60 is not loaded. The contact portion 65 thus is positioned on an inner wall of the bore hole and introduces the forces resulting from the pretensioning of the force measuring anchor into the sensor portion 64.

FIG. 7B shows a tensile measuring rod of the measuring element from FIG. 7A when the force measuring anchor B is completely unloaded. In this state, the contact portion 65 is raised from the inner wall of the bore hole and thus decoupled from the load-carrying structure of the force measuring system. This has the advantage that the force measuring anchor B cannot be overloaded or damaged by any further force on the tensile measuring rod 60. This way, at least the sensor of the load measuring anchor is structurally protected from overloading within the nominal load range, but also against overloading above the nominal load range, but in particular starting from a specific load value or unloading value.

FIG. 8 shows an alternative embodiment of a tensile measuring rod of the measuring element 80. It shows the tip of the threaded force measuring anchor B as a cut out in the bore hole, in particular its sensor portion 84 and contact portion 85. The embodiment according to FIG. 8 differs from the embodiment from FIGS. 7A, 7B in that a hardened plate 86 is arranged in the bore hole, and in that the contact portion 85 of the force measuring anchor B abuts the plate 86. The hardened portion has a greater hardness than the material of which the tensile measuring rod is manufactured. The plate 86 shows less wear and is less prone to permanent deformation that could impact the measuring accuracy.

FIG. 9A shows an alternative embodiment of the tensile measuring rod of the measuring element 90 having a hardened plate 96 disposed in a hole that has a recess 97 for a contact portion 95 of the force measuring anchor which is designed as a spherical calotte. The contact portion 95 is formed by a sphere which is operatively engaged with a sensor portion 94. This way, an optimized transfer of force from the tensile measuring rod to the force measuring anchor is guaranteed.

The hardened plate 96 is manufactured from hardened steel or a hard metal material or an alloy or a ceramic. It can, however, be displaced under a high force load. Such displacement of the hardened plate 96 is illustrated by the dotted line.

FIG. 9B shows an alternative embodiment of a plate 96 that can be inserted in a hole of a tensile measuring rod of a measuring element 90, having a recess 97 for a contact portion formed as a spherical calotte which is optimized in terms of its flexion and support. The plate 96 is resilient so that the sensor does not lift.

Figure 10A:
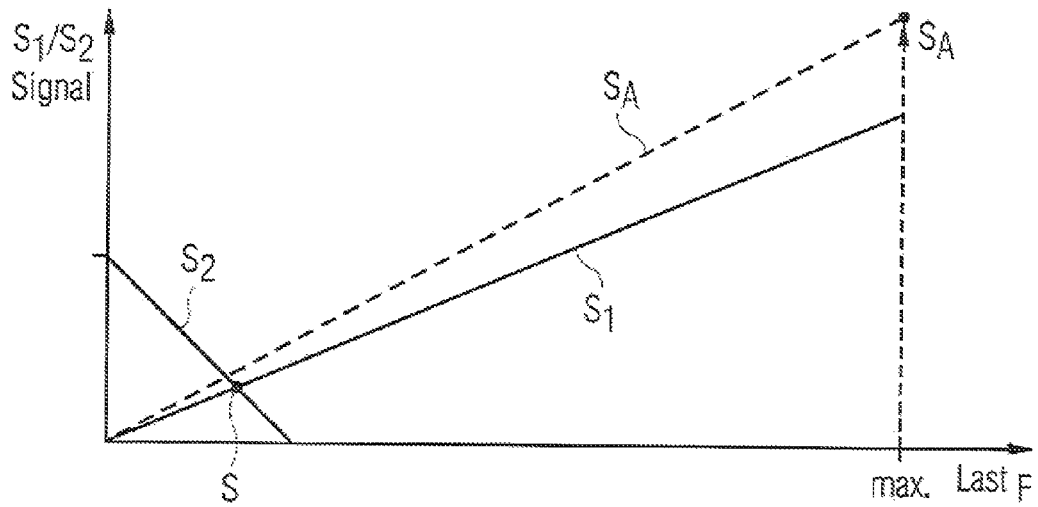

FIG. 10A schematically shows a diagram of a signal path of a sensor signal $S_1$ generated by a first force measuring sensor, and a sensor signal $S_2$ generated by a more sensitive, second force measuring sensor.

In particular, it is the case here that the first and the second force measuring sensor differ in the sense that the first force measuring sensor is designed to measure a, or a better, total nominal load range of the tensile and/or compressive load, and that the second force measuring sensor is designed to measure only a sub-range of this nominal load range.

In the drawing, signal $S_1$ hereby covers the nominal load range, namely loads in the range from 0 N up to the maximum value "max.". The sensor signal $S_2$ generated by the second force measuring sensor only measures a sub-range of the nominal load range, namely for example a load range from 0-30%.

Both sensor signals $S_1$, $S_2$ are measured at an evaluation unit AWE (not shown), which determines a total output signal $S_A$ from the sensor signals $S_1$, $S_2$, which is for example emitted in the HART or Profibus or 4-20 mA standard.

In particular, the evaluation unit is configured such that it always uses the better quality signal for generating the output signal.

In FIG. 10, it is in particular signal $S_2$ which resolves more accurately at lower loads than the first sensor with signal $S_1$. Since the sensor is more sensitive, it is also structurally protected against overloading above the point of intersection S, e.g. as shown in FIGS. 7-9. This, however, can also be structurally solved in different ways.

Figure 10B:
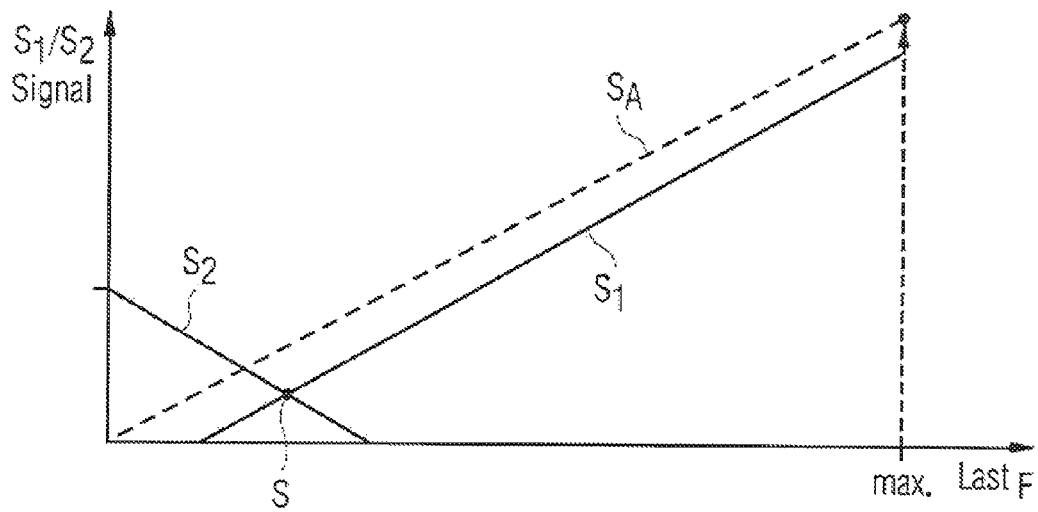

According to FIG. 10B it is also conceivable that both sensor signals $S_1$, $S_2$ cover only sub-ranges of the nominal load range, and that below the intermediate value, point of intersection S, a common transfer range emerges. Depending on the configuration of the evaluation unit, the total output signal $S_A$ can be generated by the sensor signal $S_1$ or $S_2$, at a specified point or in a specified range within the common range.

Thus, the first and the second force measuring sensor differ in the sense that the first force measuring sensor is designed to measure a first sub-range of a nominal load range of the tensile and/or compressive load, and the second force measuring sensor is designed to measure a second sub-range of said nominal load range. Preferably, the proportion of the one sensor in the lower range is lower than the one of the sensor that resolves in the higher range. The two ranges intersect in a range or at a point, wherein there can also be a transfer point or range for increasing loads, and another point or range for decreasing loads.

Furthermore, during the transfer, or when deciding from which point on the other sensor signal is to be used, a specified route or range can precede in which the two signals are compared and tested for reliability. In particular, comparative values or stored prior measurement data from a memory can be used.

It is furthermore possible that—insofar as this load condition occurs in each case—within the common range, both sensor signals are continuously compared and an agingrelated drift is analyzed, recognized and compensated, or that with too great a deviation from an earmarked value, an error signal is emitted.

It is further conceivable that a sensor signal is enabled or disabled only above a specified measuring value so that the signal path of a single sensor signal ($S_1$ or $S_2$) runs in a step-like manner. In particular, it is also possible that the sensor signal $S_1$, particularly in the lower range below the point "S", runs curvilinear, or is characterized by a strong noise—an effect which is particularly improved according to the invention by the second sensor $S_2$.

As shown in FIG. 10C, it is also possible that both sensor signals $S_1$, $S_2$ emit a signal uniformly focused on tension or compression, wherein according to the load type or application, at a fixed point S, one sensor signal can be switched to the other.

Similarly, one sensor can be loaded or unloaded for tension, and the other for pressure, wherein the signals nevertheless are emitted and processed in positive values according to the suspended load. In particular, a signal output $S_1/S_2$ runs in the form of a straight line, wherein it represents the approximation or best approximation to a value output curve of a sensor. It is equally possible that the transfer point S or a load range is configured for switchover and can be deposited in the evaluation, or that it can be manually and arbitrarily switched back and forth (e.g. from a measuring or operating station) between both sensor sources.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A force measuring system for measuring a tensile and/or compressive load applied on a structure, the system comprising:
a first force measuring sensor; and
a second force measuring sensor,
wherein the first force measuring sensor is adapted to measure a first range of a nominal load range of the tensile and/or compressive load,
wherein the second force measuring sensor is adapted to measure a second sub-range of the nominal load range,
wherein the first force measuring sensor measures a nominal load range of the tensile and/or compressive load, and the second force measuring sensor measures only a sub-range of the nominal load range,
wherein the nominal load range extends between a minimum value and a maximum value of the tensile and/or compressive load, and wherein the sub-range extends between a lower intermediate value that is greater than the minimum value, and an upper intermediate value that is lower than the maximum value, and
wherein, the sub-range covers a maximum of 70%, a maximum of 50% or a maximum of 30% of the nominal load range.

2. The force measuring system according to claim 1, wherein the first and the second force measuring sensor differ in their structural design, load type and/or measuring sensitivity.

3. The force measuring system according to claim 1, wherein the first and the second force measuring sensor are designed such that when force is applied on the structure, one of the force measuring sensors is compressed and the other force measuring sensor is expanded.

4. The force measuring system according to claim 1, wherein the second force measuring sensor has a pretensioned measuring element which is unloaded when a force with a direction of force opposing the pretensioning is applied on the structure.

5. The force measuring system according to claim 1, wherein the first force measuring sensor and/or the second force measuring sensor is a force measuring anchor, a strain micrometer, a strain gauge or a steel sensor with a sputtered strain sensor or a piezo sensor.

6. The force measuring system according to claim 1, wherein the first force measuring sensor and/or the second force measuring sensor are arranged in a bore hole of the structure.

7. A force measuring system for measuring a tensile and/or compressive load applied on a structure, the system comprising:
a first force measuring sensor; and
a second force measuring sensor,
wherein the first force measuring sensor is adapted to measure a first range of a nominal load range of the tensile and/or compressive load,
wherein the second force measuring sensor is adapted to measure a second sub-range of the nominal load range,
wherein the first force measuring sensor and/or the second force measuring sensor are arranged in a bore hole of the structure, and
wherein in the bore hole, a hardened molding is arranged against which a measuring body of the second force measuring sensor is compressed to generate pretensioning, wherein the measuring body has a contact portion formed as a spherical calotte which is accommodated in a recess of the hardened molding, or wherein the hardened molding is resilient.

8. The force measuring system according to claim 1, wherein the force measuring system comprises an evaluation unit that evaluates a first measurement signal generated by the first force measuring sensor and a second measurement signal generated by the second force measuring sensor, wherein an output signal is measured at an outlet of the evaluation unit based on the first or second measurement signal, wherein the evaluation unit is assigned a threshold value, and wherein, dependent on the load, the first and or the second measurement signal is used to generate the output signal.

9. The force measuring system according to claim 1, wherein at least one sensor is structurally protected against overloading within the nominal load range, starting from a specific load value or unloading value.

10. The force measuring system according to claim 9, wherein the at least one sensor, which covers a lower measuring range, is mechanically unloaded or is decoupled from the structure of the force measuring system, starting at a specific value or range of values.

11. A method for measuring a tensile and/or compressive load of a structure by a force measuring system according to claim 1, the method comprising:
measuring a force resulting from a tensile and/or compressive load via the first force measuring sensor while receiving a first measurement signal;
measuring the force by a second force measuring sensor while receiving a second measurement signal; and
evaluating the first and the second measurement signal, wherein the first force measuring sensor measures the nominal load range or a first sub-range of the nominal load range, and wherein the second force measuring sensor measures a second sub-range of the nominal load range, and wherein, depending on the tensile/compressive load, by using a measurement signal, the evaluation unit provides an output signal which corresponds to the applied tensile/compressive load, wherein the first force measuring sensor measures a nominal load range of the tensile and/or compressive load, and the second force measuring sensor measures only a sub-range of the nominal load range, wherein the nominal load range extends between a minimum value and a maximum value of the tensile and/or compressive load, and wherein the sub-range extends between a lower intermediate value that is greater than the minimum value, and an upper intermediate value that is lower than the maximum value, and wherein, the sub-range covers a maximum of 70%, a maximum of 50% or a maximum of 30% of the nominal load range.

\* \* \* \* \*